United States Patent [19]
Dixon

[11] 3,850,389
[45] Nov. 26, 1974

[54] LANDING GEAR WHEEL DEVICE FOR AIRCRAFT

[76] Inventor: Donald R. Dixon, 4639 Grove St., West Palm Beach, Fla. 33406

[22] Filed: May 4, 1973

[21] Appl. No.: 357,464

[52] U.S. Cl. .......................................... 244/103 S
[51] Int. Cl. .......................................... B64c 25/38
[58] Field of Search ................ 244/103 S, 103 R; 180/65 R, 65 F; 310/209, 191

[56] References Cited
UNITED STATES PATENTS

| | | | |
|---|---|---|---|
| 2,454,947 | 11/1948 | Schroeder | 244/103 S |
| 2,505,770 | 5/1950 | Hill | 244/103 S |
| 3,153,159 | 10/1964 | Lord | 310/191 X |
| 3,191,454 | 6/1965 | Holzer | 310/209 X |
| 3,542,318 | 11/1970 | Ellsworth | 244/103 S |

Primary Examiner—George E. A. Halvosa
Assistant Examiner—Paul E. Sauberer

[57] ABSTRACT

A landing gear device for an aircraft including a landing gear having a landing wheel rotatively mounted thereon and a variable speed motor for selectively engaging the wheel and rotating the same, at a selectable speed in the forward direction during the flight of the aircraft preparatory to the landing of the aircraft, reciprocal drive element, operably interconnecting the motor to the landing wheel adapted to engage the wheel and rotate the wheel when power is applied to the electrical motor, and adapted to disengage from the wheel to permit free rotation thereof when the motor is deenergized, and speed control element, connected to the motor for substantially synchronizing the rotational speed of the landing wheel to that of the landing speed of the aircraft.

1 Claim, 4 Drawing Figures

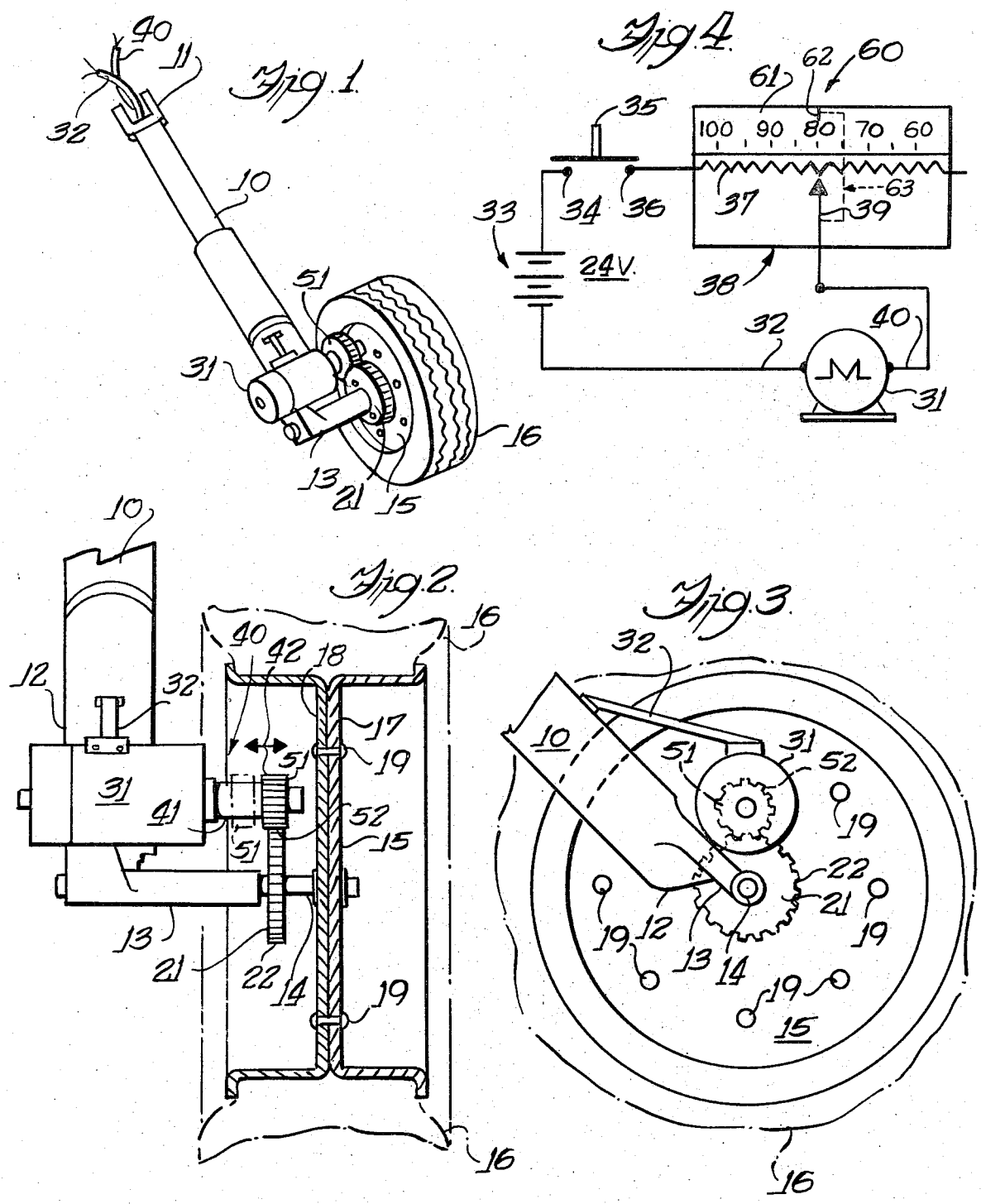

LANDING GEAR WHEEL DEVICE FOR AIRCRAFT

BACKGROUND OF THE INVENTION

1. Field of the Invention

This invention relates generally to aircraft and more particularly to a novel and improved landing gear wheel device for aircraft effective for rotating the wheels of an aircraft preparatory to the landing of the aircraft such that the wheels rotate at substantially the same speed as that of the landing speed of the aircraft.

2. Description of the Prior Art

It has been found that the wheels of aircraft have an extremely short life especially on large aircraft such as the commercial aircraft where the landing wheels each weigh many hundreds of pounds as each wheel has a large moment of inertia such that on landing the wheels are forced to slip and drag for a substantial distance upon contacting the ground when the aircraft is landing before the wheels reach the proper speed of rotation, the result being that the impact of the wheel against the ground, the resultant scuffing of the same upon contact due to the speed differences, and the substantial distance of travel before the wheel is rotating at the proper speed results in large pieces of rubber being stripped or burned off the wheel at each landing of the aircraft. Further, as runways are made of concrete, scraping and burning action of the wheels is especially severe on landing.

Prior art devices have attempted to overcome this scuffing and burning of the wheels at landing by providing rotative devices for rotating the wheels prior to landing, but such devices have proved uneconomical to manufacture and not dependable in construction to warrant their use of these same, with such devices further suffering many problems and difficulties as the wheel is not accurately controlled as to the speed of rotation relative to the landing speed of the aircraft, this causing a hazardous situation upon contact of the wheel with the ground causing control problems for the pilot who must take the same into consideration during the already complicated landing procedures of modern-day commercial aircraft.

SUMMARY OF THE INVENTION

The present invention remedies and overcomes all of the foregoing deficiencies and disadvantages of presently available landing gear wheels by providing a new and novel landing gear wheel device for rotating the wheel at a speed substantially equal to the speed of the landing of the aircraft in a manner to overcome any scuffing or burning tendencies of the wheel upon contact with the ground along with assisting the pilot in the control of the aircraft upon landing.

It is a feature of the present invention to provide a landing gear wheel device for aircraft for effecting the landing wheels thereof to rotate at substantially the same speed as that of the landing speed of the aircraft.

A further feature of the present invention is to provide a landing wheel rotating device for rotating the landing wheels of aircraft preparatory to landing on the ground in a manner to lessen the tilting or overturning thereof when landing and to prolong the life of the wheels provided on the aircraft.

Still a further feature of the present invention provides a landing wheel device for rotating the wheels of an aircraft in the air preparatory to making a landing and contacting the ground at a speed variable with the air speed of the aircraft such that upon contacting the ground the speed of rotation of the wheels is equal to the landing speed of the aircraft to make possible a smoother landing thus relieving much of the strain on the landing gear as well as the wear and tear on the wheels; increasing the safety in landing; and effecting substantial economies due to savings in the extended life of aircraft wheels and related equipment.

Yet still a further feature of the present invention provides a landing gear rotative device which is simple in construction and arrangement, strong and durable, efficient, compact and conveniently operable, which may be readily installed as part of the original equipment of the aircraft, or which may be readily installed later as an accessory item for aircraft already in use, one which is comparatively inexpensive to manufacture due to its simplicity of construction, and one which is relatively easily maintained and installed on aircraft of various sizes and configurations in a manner to prolong the life of the wheels of the aircraft.

The present invention thus overcomes the problem of excessive wheel wear and the hazards of landing associated therewith when the aircraft wheels are not rotating at a speed proportional to the landing speed of the aircraft by providing a continuously variable device for constantly controlling the rotational speed of the wheels to equal the landing speed of the aircraft such that upon landing there is little if any speed differences between the landing speed of the aircraft and the rotational speed of the wheels such that no scuffing or scraping of the wheels occur during ground impact thus prolonging the life of the wheels and overcoming the landing hazard of possible wheel blowouts and aircraft damage due to the wheels having to come up to a speed of rotation equal to the landing speed of the aircraft.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a front perspective view of a landing strut of an aircraft having a landing wheel thereon and illustrating the device of the present invention in operative engagement with the landing wheel rotating the same in a forward direction;

FIG. 2 is an enlarged fragmentary cross-sectional side elevational view of the landing wheel and device of the present invention as illustrated in FIG. 1;

FIG. 3 is an enlarged fragmentary front elevational view of the landing wheel and drive means of FIG. 1; and FIG. 4 is a schematic wiring diagram for the present invention.

DESCRIPTION OF THE PREFERRED EMBODIMENT

With reference to the drawings as hereinafter set forth in greater detail, it is to be understood that for purposes of convenience only a landing strut having a landing wheel and the device of the present invention applied thereto has been selected for illustration of the present invention, with it being understood that the present invention may be applied to landing struts and landing wheels of aircraft of all sizes and configurations as envisioned within the scope of the present invention.

Referring now to the drawings, there is illustrated a landing strut 10 having a top end 11 adapted for mounting in the usual manner on an aircraft (not shown) with the bottom end 12 having a bushing member 13 connected thereto and adapted for receiving therein one end portion of an axle 14 having the opposite end portion attached by conventional means to an aircraft wheel 15 including the usual provided heavy rubber tire 16 concentrically mounted about the wheel 15.

As indicated in FIG. 2, wheel 15 is shown as consisting of two symmetrical halves 17 and 18 interconnected by rivets 19.

Axle 14 and bushing member 13 extend perpendicular to wheel 15, with a gear wheel 21 concentrically mounted on axle 14 interposed between wheel 15 and bushing member 13, the gear wheel having teeth 22 disposed about the outermost peripheral edge thereof.

An electrical motor 31 is mounted on landing strut 10 and is further secured thereto by brace member 32 extending between the motor and the landing strut with the axis of the motor disposed parallel to the axle 14 and radially spaced therefrom. A drive assembly generally designated by reference numeral 40 consists of an axially disposed drive shaft 41 having one end connected to motor 31 with the free end thereof projecting axially therefrom in a direction toward wheel 15 and having a gear wheel 51 with peripheral teeth portions 52 mounted on the free end in a position to engage in an operative manner with gear wheel 21. The drive shaft 41 is axially reciprocal relative to motor 31 between a first operative position where gear wheel 51 is operatively engaged with gear wheel 21, and a second inoperative position where gear wheel 51 is disengaged from gear wheel 21. In the operative position, gear wheels 51 and 21 are in engagement for driving by motor 31 in a manner to rotate wheel 15 in a forward direction. In the inoperative position of drive shaft 41, the gear wheel 51 is as indicated in phantom configuration in FIG. 2 as disengaged from gear wheel 21 such that wheel 15 is freely rotatable about bushing member 13.

Referring now to FIG. 4, it is seen that motor 31 has a lead wire 32 connected to a power source 33 of the aircraft's electrical system, which, for purposes of convenience, is indicated as being 24 volts D.C., the opposite end of the power source connected to a first pole 34 of a switch 35 which is arranged to connect and disconnect the first pole to a second pole 36 for completing or breaking the electrical circuit therebetween. The second pole 36 is in turn arranged in series with a resistant wire 37 of a rheostat assembly generally designated by reference numeral 38, the rheostat having a slideable contact 39 adapted for sliding engagement with resistance wire 37, the sliding contact 39 being in electrical contact with a lead wire 40 of motor 31.

The rheostat arrangement 38 is of a suitably arranged assembly with a conventional type air speed indicating device generally designated by reference number 60 and having marking indicia 61 thereon calibrated to read the air speed of the aircraft on movable pointer 62. Sliding contact 39 is associated with air speed indicator 60 and mechanically connected to movable pointer 62 by linkage 63 for simultaneous movement therewith such that upon closing the switch 35 to complete the electrical circuit, the motor 31 is energized at a speed which is controlled by rheostat 38 and which is a direct function of the air speed as indicated by pointer 62 on air speed indicator 60 thereby automatically continuously varying the speed of motor 31 whereby the rotative speed of wheel 50 is a function of the air speed indicator and the wheel is thus rotating at a speed equal to the air speed. As the motor 31 is energized just preparatory to the landing of the aircraft, as the aircraft slows for landing the air speed similarly slows and is indicated on air speed indicator 60, this automatically slowing the rotative speed of wheel 50 such that upon ground contact of tire 16 the wheel is rotating at the landing speed of the aircraft so that there is no scuffing, scraping or sliding of the wheel along the ground.

Drive shaft 41 is connected to motor 31 such that upon energization of motor 31 the drive shaft 41 moves axially outwardly therefrom to effect engagement of gear wheel 51 with gear wheel 21 to rotate wheel 15 at a speed controlled by rheostat 38 in connection with air speed indicator 60, and upon landing switch device 35 is disconnected to deenergize motor 31 thereby effecting the automatic axially slideable movement of drive shaft 41 inwardly of motor 31 to immediately disengage gear wheel 51 from gear wheel 21 permitting the free rotation of wheel 15 upon contact with the ground. This axial slideable movement of drive shaft 41 is as indicated by arrow 42 in FIG. 2.

It is to be understood that switch device 35 may be connected to a landing sensor type switch or the like (not shown) in a known manner to automatically disconnect and deenergize motor 31 upon contact of tire 16 with the ground, or for less expensive and less complicated arrangements, switch device 35 may be manually operable by the pilot of the aircraft and manually disengaged at a convenient time after landing, with it being understood that motor 31 is of a size and capacity for effecting the desired rotation of the wheel 15 when in the air and not subjected to external forces so that upon landing the forward force of the aircraft and inertia of the wheel 15 would be substantially greater than any drive force exerted by motor 31. Accordingly, the motor 31 need not be promptly deenergized as it will not affect the control of the aircraft and landing wheel 15 due to the much greater landing forces exerted on the wheel than the small force exerted by the motor.

There is thus provided a landing gear wheel device for effecting rotation of landing wheels preparatory to landing the aircraft, the wheel rotation being substantially equal to the air speed of the aircraft which, upon landing, becomes equal to the landing speed such that the wheel is rotating at substantially the same speed as that of the landing speed of the aircraft thus lessening the chance of tilting or overturning of the aircraft when a wheel is not rotating, and serving to prolong the life of the tires on the wheels of the aircraft.

It is to be understood that the form of this invention herewith shown and described is to be taken as preferred examples of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. A landing gear wheel device for an aircraft including a landing gear having a landing wheel rotatably mounted about a shaft projecting outwardly from a landing strut, the device comprising:

an electrically powered motor mounted on the strut and having its axis disposed substantially parallel to the axis of the wheel and spaced radially therefrom;

a first circular gear wheel concentrically mounted to the wheel adjacent one side thereof and having gear teeth disposed about its peripheral edge surface;

an axially reciprocally movable longitudinally disposed drive shaft having one end connected to the motor with the free end thereof extending axially away from the motor in a direction toward the landing wheel;

a second gear wheel mounted to the free end of the drive shaft and disposed in a plane parallel to the first gear wheel and having gear teeth disposed about the peripheral edge surface thereof complementary to the gear teeth on the first gear wheel;

the gear teeth of the first gear wheel and second gear wheel adapted to drivingly mesh together;

the drive shaft being automatically slidably movable in a first axial direction toward the landing wheel upon the electrical energization of the motor to engage the first and second gear wheels in a manner to drivingly rotate the landing wheel in a forward direction, and the drive shaft being automatically axially slidably movable in a second direction opposed to the first direction upon the electrical de-energization of the motor to disengage the first and second gear wheels permitting free rotative movement of the landing wheel;

an air speed indicator operable to continuously indicate the air speed of the aircraft, the indicator including a movable pointer to indicate such air speed on a suitably marked scale;

a variable resistant rheostat assembly including a resistance coil and a sliding contact operable thereover to selectively vary the resistance of the rheostat assembly;

linkage means mechanically interconnecting the air speed indicator pointer to the rheostat assembly sliding contact for the automatic simultaneous movement of the sliding contact with the pointer member to vary the electrical resistance of the rheostat assembly as a direct function of the indicated air speed of the aircraft in an automatic manner;

an electrical power source;

circuit means connecting the motor in electrical series relationship to the power source and to the rheostat assembly with the rheostat effecting the varying of the speed of the motor;

a switch device interposed in series circuit arrangement between the power source and the motor for energizing and de-energizing the motor; and the rheostat assembly disposed in series circuit arrangement with the motor and the power source for automatically controlling the speed of rotation of the motor in accordance with the air speed of the aircraft as indicated by the air speed indicator pointer member so that upon closing the switch device the drive shaft automatically effects engagement of the first and second gear wheels to rotate the landing wheel in a forward direction at a speed substantially equal to the air speed of the aircraft which in turn is substantially equal to the landing speed of the aircraft upon the wheel engaging the ground during the landing, the speed of the wheel thus automatically varying with the variance of the aircraft air speed to rotate at substantially the same speed as the landing speed of the aircraft to minimize any scraping or sliding tendencies of the landing wheel upon contact with the ground.

* * * * *